United States Patent
Leisenberg

(10) Patent No.: US 8,651,856 B2
(45) Date of Patent: Feb. 18, 2014

(54) METHOD AND DEVICE FOR HEAT RECOVERY

(75) Inventor: Wolfgang Leisenberg, Bad Nauheim/Steinfurth (DE)

(73) Assignee: Innovatherm Prof. Dr. Leisenberg GmbH (DE)

(*) Notice: Subject to any disclaimer, the term of this patent is extended or adjusted under 35 U.S.C. 154(b) by 845 days.

(21) Appl. No.: 12/678,005

(22) PCT Filed: Sep. 18, 2007

(86) PCT No.: PCT/EP2007/059849
§ 371 (c)(1),
(2), (4) Date: Aug. 27, 2010

(87) PCT Pub. No.: WO2009/036799
PCT Pub. Date: Mar. 26, 2009

(65) Prior Publication Data
US 2011/0017423 A1    Jan. 27, 2011

(51) Int. Cl.
*F27B 7/02* (2006.01)

(52) U.S. Cl.
USPC .......................................................... 432/192

(58) Field of Classification Search
USPC ............................................ 432/19, 192, 249
See application file for complete search history.

(56) References Cited

U.S. PATENT DOCUMENTS

| 3,822,190 A | 7/1974 | Fischer |
| 4,128,394 A * | 12/1978 | Naito et al. ............ 432/137 |
| 4,253,823 A | 3/1981 | Holdner |
| 4,332,551 A * | 6/1982 | Haslmayr et al. ............ 75/755 |
| 4,569,835 A | 2/1986 | Di Cio |
| 6,027,339 A | 2/2000 | Dreyer et al. |
| 2010/0209863 A1 * | 8/2010 | Jonville et al. ............ 432/6 |

FOREIGN PATENT DOCUMENTS

| DE | 3538151 | 4/1987 |
| EP | 1093560 A1 | 4/2001 |
| EP | 1785685 | 5/2007 |

OTHER PUBLICATIONS

PCT International Preliminary Report on Patentability and Written Opinion of the International Searching Authority dated Apr. 7, 2010.
International Search Report and Written Opinion under date of mailing Dec. 6, 2007 in connection with International Patent Application PCT/EP2007/059849.
Dr. Ulrich Mannweiler, Stefan Oderbolz, Peter Sulzberger "Process Control in an Anode Bake Furnace Fired With Heavy Oil" Light Metals 1991.

* cited by examiner

*Primary Examiner* — Gregory A Wilson
(74) *Attorney, Agent, or Firm* — Quarles & Brady LLP

(57) ABSTRACT

A heat recovery method in the manufacture of anodes in an annular anode furnace includes conveying a first partial quantity of the hot air produced in a cooling zone by the waste heat of the anodes into a heating-up zone using a first suction device. A second partial quantity of the hot air produced in the cooling zone is conveyed to a heat exchanger that is realized independently of the annular anode furnace using a second suction device. The heat transfer medium that serves for operating the heat exchanger is primarily heated with the hot air withdrawn from the cooling zone.

20 Claims, 1 Drawing Sheet

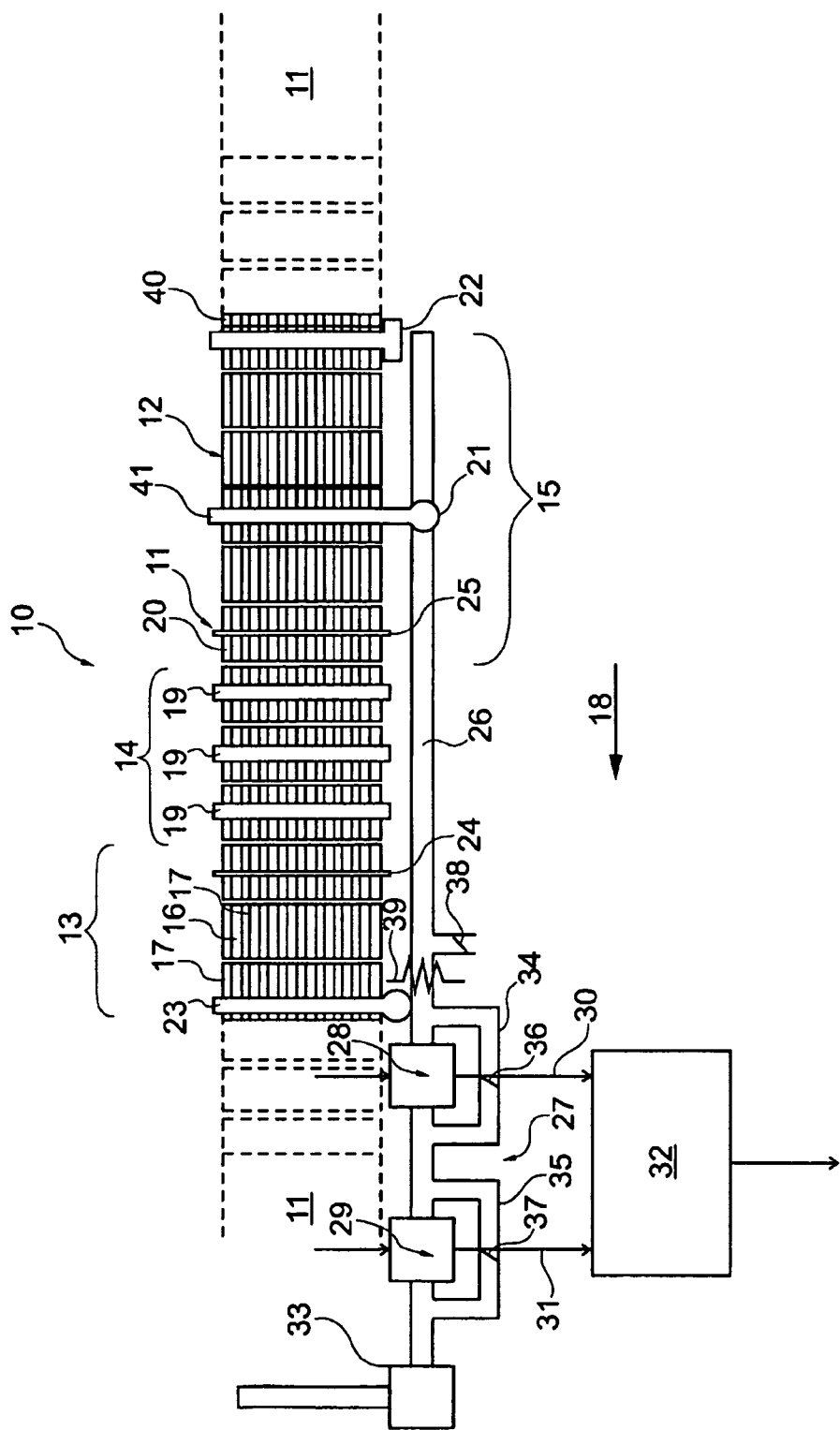

METHOD AND DEVICE FOR HEAT RECOVERY

CROSS REFERENCE TO RELATED APPLICATIONS

This application represents the national stage application of International Application PCT/EP2007/059849 filed 18 Sep. 2007, which is incorporated herein by reference in its entirety for all purposes.

STATEMENT REGARDING FEDERALLY SPONSORED RESEARCH OR DEVELOPMENT

Not applicable.

FIELD OF THE INVENTION

The invention pertains to a heat recovery method in the manufacture of anodes in an annular anode furnace that comprises at least one furnace unit with a heating-up zone, a firing zone and a cooling zone that respectively feature a plurality of chambers in the form of heat exchangers that are interconnected by heating flues and serve for accommodating the anodes, wherein a first partial quantity of the hot air produced in the cooling zone by the waste heat of the anodes is conveyed into the heating-up zone by means of a first suction device and a second partial quantity of the hot air produced in the cooling zone is conveyed to another heat exchanger that is realized independently of the annular anode furnace by means of a second suction device in order to operate the heating-up zone. The invention furthermore pertains to a device for carrying out the aforementioned method.

The present method is used in the manufacture of anodes that are required for electrolytic smelting processes for the production of primary aluminum. These anodes are manufactured in a moulding process from petroleum coke, to which pitch is added as a binder, namely in the form of so-called "green anodes" or "raw anodes" that are sintered in an annular anode furnace subsequent to the moulding process. This sintering is realized in a heat treatment process that takes place in a defined sequence and during which the anodes run through three phases, namely a heating-up phase, a sintering phase and a cooling phase. In this case, the raw anodes are situated in the heating-up zone of a "fire" that is composed of the heating-up zone, the firing zone and the cooling zone and realized in a rotating fashion on the annular anode furnace, wherein the raw anodes are pre-heated by the waste heat of already finish-sintered anodes that originates from the cooling zone before the pre-heated anodes are heated to the sintering temperature of approximately 1050° C. in the burning or firing zone.

BACKGROUND OF THE INVENTION

In the state of the art, for example, according to EP 1 785 685 A1, the different above-described zones are defined by an alternately revolving arrangement of different modules above furnace chambers that accommodate the anodes and act as a heat exchanger. The burning or firing zone arranged between the heating-up zone and the cooling zone is defined by the positioning of the burner device above the selected furnace chambers. The cooling zone accommodates the finished anodes immediately after they were fired, i.e., heated to the sintering temperature. A blower device is arranged above the cooling zone and serves for introducing air into the chambers of the cooling zone, wherein a suction device arranged above the heating-up zone conveys this air from the cooling zone into the heating-up zone via the firing zone, namely through heating flues that interconnect the chambers, and wherein this air is then conveyed in the form of flue gas from the heating-up zone through a flue gas cleaning system and released into the surroundings.

In EP 1 785 685 A1, it is proposed to convey the flue gas quantity that is withdrawn from the heating-up zone by means of the suction device and still has a temperature between 150° C. and 250° C. to a heat exchanger that should make it possible to heat the petroleum coke to approximately 150° C. prior to the moulding of the "green anodes" in a mixing and moulding module in order to ensure an improved wettability with liquid pitch during the subsequent mixing process. It is proposed that the heat exchanger for heating the petroleum coke be realized in the form of a fluidized bed or moving bed heat exchanger that needs to have a flue gas temperature of 250° C. in order to reach the desired petroleum coke temperature and is intended as a replacement for the heat exchanger in the form of a "pre-heating spiral" that was used so far in conventional systems and is operated with a heat transfer medium in the form of a heat transfer oil with a temperature of approximately 300° C.

The utilization of the method known from EP 1 785 685 A1 therefore is not possible in existing systems. In fact, the utilization of the method requires substantial modifications of the system technology for the manufacture of raw anodes. These modifications of the system technology not only include the replacement of the known pre-heating spiral with the above-described fluidized bed or moving bed heat exchanger, but also a flue gas discharge from the heating-up zone through the raw anode manufacture because it is proposed to withdraw hot air from the cooling zone of the annular anode furnace by means of a suction device and to mix this hot air with the flu gas if the temperature of the flue gas does not suffice for operating the heat exchanger. This combination of two volumetric flow rates with different temperatures for achieving the desired temperature of the heat transfer medium of the heat exchanger requires a correspondingly complex control with corresponding system technology.

SUMMARY OF THE INVENTION

The present invention therefore is based on the objective of proposing a method and a device that make it possible to utilize the waste heat released during the operation of an annular anode furnace for the manufacture of raw anodes, namely such that the existing system technology is largely preserved. In embodiments described herein, this objective is respectively attained with a method and device described herein.

In the inventive method described herein, the heat exchanger that is realized independently of the annular anode furnace is primarily heated with the hot air withdrawn from the cooling zone.

The invention is based on the notion that only part of the cold air that is blasted into the cooling zone in order to cool furnace chambers and anodes and heated to approximately 950° C. in the cooling zone is required in the form of pre-heated combustion air for the firing zone. Until now, the remainder of the cooling air was released into the surroundings, i.e., the furnace house, through exhaust air openings in the cooling zone. According to the invention, the thermal energy contained in the exhaust air is used for operating a heat exchanger that is realized independently of the actual annular anode furnace and serves for heating the petroleum coke during the course of the raw anode manufacture in the present application.

A corresponding thermal balance makes it clear that the quantity of heat that until now was released into the surroundings from the cooling zone in the form of waste heat suffices for ensuring the temperature of the heat transfer medium required for the operation of a heat exchanger in the form of a pre-heating spiral. Since the required temperature of the heat transfer medium in the form of a heat transfer oil for the operation of the heating spiral lies at 300° C. and the thermal energy that is released in the cooling zone and not required for pre-heating the anodes in the firing zone suffices in any case for obtaining a sufficient quantity of hot air with the required minimum temperature of approximately 400° C. for tempering the heat transfer oil, the inventive method not only makes it possible to continue the operation of the system with a heat exchanger that is realized in the form of a heating spiral, but also to replace the conventional heating boiler that has been used so far for tempering the heat transfer oil and is operated with costly oil or gas.

In addition, the utilization of the cooling heat on a thus far unknown scale makes it possible to largely prevent undesirable heating of the furnace house that was unavoidable until now.

In any case, the inventive method makes it possible to forgo the utilization of the flue gas discharged from the heating-up zone for operating the heat exchanger used for heating the petroleum coke and to instead carry out the tempering of the heat exchanger by means of the hot air that is directly withdrawn from the cooling zone and not contaminated unlike polluted flues gas.

If a temperature gradient exists toward the firing zone in a plurality of successively arranged furnace chambers of the cooling zone, it is possible to influence the temperature of the quantity of hot air withdrawn from the cooling zone by selecting the suitable furnace chamber(s) for positioning the suction device.

Since the hot air temperature after the discharge from the heat exchanger for operating a heating spiral still exceeds 300° C., it is advantageous to convey this hot air through one or more additional heat exchangers in order to meet additional thermal requirements in an anode factory, if so required.

If the hot air temperature or the volumetric flow rate is excessively high with respect to the temperature required for the additional heat exchanger or additional heat exchangers, it is possible to convey a partial quantity of the heat exchanger flow introduced into the heat exchanger past the heat exchanger and into a bypass. This makes it possible to influence the quantity of heat conveyed to the heat exchanger.

In order to respectively pre-heat the pitch to be admixed to the petroleum coke and the modules participating in the mixing process in addition to a pre-heating of the petroleum coke, it may prove advantageous to convey the heat flow discharged from the heat exchanger and/or the bypass flow to one or more additional heat exchangers.

With respect to the adjustment of the desired temperature of the heat flow conveyed to the heat exchanger, it may furthermore prove advantageous to mix the second partial quantity withdrawn from the cooling zone with ambient air or fresh air. In order to influence the temperature of the heat flow, it is also advantageous if the second partial quantity withdrawn from the cooling zone is heated by means of a heating device before the admission into or after the admission from the additional heat exchanger.

This can be particularly advantageous during the start of the system for the manufacture of raw anodes when no hot air is available yet from the annular anode furnace or in instances in which sufficient heat for heating up the petroleum coke is temporarily or permanently unavailable.

In order to ensure that the entire usable waste heat or cooling heat is discharged from the cooling zone, it may prove advantageous if the furnace unit ("fire") that is composed of the heating-up zone, the firing zone and the cooling zone is fluidically sealed relative to other furnace units.

Another advantageous option for influencing the quantity of heat withdrawn from the cooling zone consists of individually adjusting the partial quantity withdrawn from the cooling zone by the suction device for each heating flue.

In an embodiment of the inventive device, a suction device is arranged in the cooling zone and directly connected to an additional heat exchanger that is realized independently of the annular anode furnace by means of a withdrawal line.

This "direct" connection of the suction device to the heat exchanger makes it possible to supply the heat exchanger with thermal energy that originates from the cooling zone of the annular anode furnace only.

BRIEF DESCRIPTION OF THE DRAWINGS

One preferred embodiment of the device used in the corresponding method is described in greater detail below with reference to the FIGURE.

In the drawings:

FIG. 1 shows a schematic drawing of a furnace incorporating the present invention.

DETAILED DESCRIPTION OF THE EXAMPLE EMBODIMENTS

The FIGURE shows an annular anode furnace 10 that typically consists of a plurality of furnace units 11. In the present embodiment, each furnace unit 11 features 12 furnace chambers 12, different numbers of which are combined into a heating-up zone 13, a firing zone 14 and a cooling zone 15.

The furnace units 11 are respectively realized identically and feature pits 16 that are respectively bordered by heating flues 17 on both sides viewed in the longitudinal direction of the furnace unit 11. The pits 16 serve for accommodating anodes that extend perpendicular to the plane of projection and are accommodated in the pits 16 in rows. The heating flues 17 of the furnace chambers 12 are fluidically interconnected in the longitudinal direction of the furnace unit 11.

A number of different devices situated above the furnace chambers 12 can be variably positioned relative to the furnace chambers 12 in the rotating direction 18 and—as described below—define the position of the heating zone 13, the firing zone 14 and the cooling zone 15 that are advanced in the rotating direction 18 together with the devices due to their respective allocation.

In the configuration illustrated in the FIGURE, the firing zone 14 of the furnace unit 11 is provided with three burner devices 19 that are also referred to as so-called "fires." The burner devices 19 are respectively allocated to one furnace chamber 12, the pits 16 of which accommodate raw anodes that are heated to a temperature of approximately 1050° C. by means of the burner devices 19 and sintered in order to manufacture anodes that can be used in electrolytic smelting processes. Instead of heating the anodes directly by means of the burner devices 19, heat is transferred from the air conveyed in the heating flues 17 to the anodes arranged in the pits 16 via heating flues walls 20. The furnace chambers 12 therefore act as a heat exchanger.

The cooling zone 15 in the present example is situated to the right of the firing zone 14 referred to the FIGURE and comprises six furnace chambers 12, in which the raw anodes were sintered under high temperatures during two preceding firing phases, in which the burner devices 19 are positioned accordingly. In the configuration illustrated in the FIGURE, a suction device 21 is situated above a central furnace chamber 12 of the cooling zone 15. A blower device 22 for acting upon the heating flues 17 with fresh air or ambient air is situated to the right of the suction device 21 and still within the cooling zone 15.

Another suction device 23 for the flue gases is arranged in the heating-up zone 13 to the left of the firing zone 14 and above the furnace chambers 12, in which non-sintered raw anodes are situated that were not subjected to high temperatures by the burner devices 19 yet.

The FIGURE furthermore shows that a measuring device 24 arranged in the heating-up zone 13 features not-shown sensors for determining the pressure and the temperature in the heating-up zone 13 in order to control or regulate the processes taking place in the annular anode furnace. Another measuring device 25 is situated in the cooling zone 15 directly behind the firing zone 14 and serves for determining the heating flue pressure behind the firing zone 14.

During the operation of the annular anode furnace 10, the anodes are subjected to high temperatures in the firing zone 14 and the quantity of heat stored in the anodes that are arranged in the cooling zone 15 and were previously subjected to high temperatures by the burner devices 19 is simultaneously released. The corresponding waste heat is conveyed as far as the heating-up zone 13 by means of the suction device 23 arranged in the heating-up zone 13, namely while simultaneously supplying fresh air by means of the blower device 22, and serves for pre-heating the anodes in the heating-up zone before they are acted upon by the burner devices 19. In this case, suitable throttle and control devices are used for adapting the functions of the blower device 22 and of the suction device 23 to one another in such a way that a predetermined march of temperature is adjusted as a function of the time in the heating flues that extend between the pits 16 in connection with a controlled fuel supply of the burner devices 19.

The FIGURE furthermore shows that the suction device 21 arranged in the cooling zone 15 is connected to a withdrawal line 26 that represents a direct connection between the cooling zone 15 and a heat exchanger device 27 that comprises two heat exchanger units 28 and 29 in the present embodiment. Due to the serial connection of the heat exchanger units 28 and 29 illustrated in the FIGURE, the front heat exchanger unit 28 referred to the flow direction is subjected to a higher temperature than the following heat exchanger unit 29. In the arrangement of the suction device 21 above a central furnace chamber 12 of the cooling zone 15 illustrated in the FIGURE, it must be assumed that the hot air introduced into the withdrawal line 26 has a temperature of approximately 450° C. A throttle device 41 provided on the suction device 21 makes it possible to influence the air temperature by supplying fresh air.

In connection with the quantity of air conveyed in the withdrawal line 26, the normal operating mode of the annular anode furnace 10 always provides sufficient thermal energy, for example, for heating a heat transfer oil that is used as the heat transfer medium in a heat exchanger unit 28 to a sufficiently high temperature for heating the stream of petroleum coke being transported through the heat exchanger unit 28 to a temperature of at least 150° C. The thermal energy that remains in the hot air flow and the withdrawal line 26 at the outlet of the heat exchanger unit 28 usually suffices for pre-heating heat transfer oil 31 being conveyed through the heat exchanger unit 29 to such a degree that the desired wettability of the petroleum coke with liquid pitch for the manufacture of raw anodes can be realized. The hot air discharged from the second heat exchanger unit 29 can subsequently be released into the surroundings by means of a blower device 33 or used for tempering other heat consumers, for example, for heating rooms.

The FIGURE furthermore shows that the heat exchanger units 28 and 29 in the embodiment shown are provided with bypass lines 34, 35 that are respectively equipped with a throttle device 36, 37. This makes it possible to control the quantity of heat introduced into the heat exchanger units 28, 29 by means of the hot air originating from the cooling zone 15. In addition, a throttle device 38 is provided upstream of the heat exchanger device 27 and makes it possible to supply fresh air in an adjustable fashion, for example, in order to reduce the temperature of the hot air in the withdrawal line or for increasing the volumetric flow rate. A heating device 39 is provided upstream of the heat exchanger device 27 for instances, in which the temperature of the hot air supplied to the heat exchanger device 27 does not suffice.

In order to realize a largely complete utilization of the waste heat released in the cooling zone 15, a shut-off device 40 is provided in the embodiment illustrated in the FIGURE on the last furnace chamber 12 referred to the upstream direction as a fluidic boundary relative to the adjacent furnace chamber 12, wherein said shut-off device ensures in cooperation with the suction device 21 that the entire cooling heat is discharged from the furnace chambers 12 arranged in between.

The invention claimed is:

1. A heat recovery method in the manufacture of anodes in an annular anode furnace that has at least one furnace unit with a heating-up zone, a firing zone and a cooling zone that respectively feature a plurality of furnace chambers in the form of heat exchangers that are interconnected by heating flues and serve for accommodating the anodes, said method comprising:
   withdrawing a first partial quantity of hot air produced in the cooling zone by waste heat of the anodes into the heating-up zone using a first suction device, said first partial quantity of hot air operating the heating-up zone;
   withdrawing a second partial quantity of hot air only from the cooling zone to another heat exchanger that is realized independently of the annular anode furnace using a second suction device, wherein heat transfer medium that serves for operating at least one of the heat exchangers is directly heated with the hot air withdrawn only from the cooling zone.

2. The method according to claim 1, wherein the second suction device is positioned in the cooling zone in dependence on the temperature required for an additional heat exchanger.

3. The method according to claim 1, wherein the second partial quantity withdrawn from the cooling zone is divided into a heat exchanger flow that is introduced into the heat exchanger and a bypass flow that is conveyed past the heat exchanger in dependence on the temperature required for the additional heat exchanger.

4. The method according to claim 3, wherein the heat flow discharged from the heat exchanger and/or the bypass flow is/are conveyed to one or more additional heat exchangers.

5. The method according to claim 1, wherein the second partial quantity withdrawn from the cooling zone is mixed with ambient air.

6. The method according to claim 1, wherein the second partial quantity withdrawn from the cooling zone is heated by means of a heating device before the admission into the heat exchanger.

7. The method according to claim 1, wherein the furnace unit that is composed of the heating-up zone, the firing zone and the cooling zone is operated in a fluidically sealed fashion relative to other furnace units.

8. The method according to claim 1, wherein the partial quantity withdrawn from the cooling zone by the suction devices can be individually adjusted for each heating flue.

9. The method according to claim 1, wherein a blower device supplies the cooling zone with a quantity of air, the distribution of which over the heating flues can be individually adjusted.

10. A heat recovery device in the manufacture of anodes, comprising:
at least one furnace unit of an annular anode furnace, said at least one furnace unit including a heating-up zone, a firing zone and a cooling zone that respectively feature a plurality of furnace chambers in the form of heat exchangers that are interconnected by heating flues and serve for accommodating the anodes;
a first suction device withdrawing hot air from the cooling zone into the heating-up zone; and
a second suction device withdrawing hot air only from the cooling zone, wherein the second suction device is directly connected by a withdrawal line to a heat exchanger that is independent of the annular anode furnace, said withdrawal line providing the heat exchanger connected to the suction device by the withdrawal line with the hot air withdrawn only from the cooling zone.

11. The device according to claim 10, wherein the second suction device can be connected to different furnace chambers of the cooling zone.

12. The device according to claim 10, wherein the heat exchanger independent of the anode furnace is provided with a bypass line.

13. The device according to claim 10, wherein the heat exchanger independent of the anode furnace features several interconnected heat exchanger units.

14. The device according to claim 13, wherein the heat exchanger units are at least partially provided with a bypass line.

15. The device according to claim 10, wherein the second suction device or the withdrawal line is provided with an adjustable fresh air device.

16. The device according to claim 10, wherein the withdrawal line is provided with a heating device.

17. The device according to claim 10, wherein the at least one furnace unit that is composed of the heating-up zone, the firing zone and the cooling zone is fluidically sealed relative to another furnace unit by means of a shut-off device.

18. The device according to claim 10, wherein the second suction device features a plurality of throttle devices that are respectively allocated to one of the plurality of heating flues.

19. The device according to claim 10, wherein a blower device is allocated to the cooling zone and provided with a plurality of throttle devices that are respectively allocated to the heating flues.

20. The device according to claim 10, wherein the second suction device features a plurality of ventilating fans that are respectively allocated to one of the plurality of heating flues.

* * * * *

UNITED STATES PATENT AND TRADEMARK OFFICE
CERTIFICATE OF CORRECTION

PATENT NO.       : 8,651,856 B2
APPLICATION NO. : 12/678005
DATED            : February 18, 2014
INVENTOR(S)      : Wolfgang Leisenberg It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Twenty-ninth Day of September, 2015

Michelle K. Lee
*Director of the United States Patent and Trademark Office*